United States Patent
Foh

(10) Patent No.: US 10,953,485 B2
(45) Date of Patent: Mar. 23, 2021

(54) WELDING POWER SOURCE WITH IMPROVED FUNCTIONAL ROBUSTNESS

(71) Applicant: Illinois Tool Works Inc., Glenview, IL (US)

(72) Inventor: Marcel Foh, Markdorf (DE)

(73) Assignee: Illinois Tool Works Inc., Glenview, IL (US)

( * ) Notice: Subject to any disclaimer, the term of this patent is extended or adjusted under 35 U.S.C. 154(b) by 201 days.

(21) Appl. No.: 16/136,853

(22) Filed: Sep. 20, 2018

(65) Prior Publication Data

US 2019/0091793 A1    Mar. 28, 2019

(30) Foreign Application Priority Data

Sep. 22, 2017   (DE) .................. 10 2017 122 068

(51) Int. Cl.
| | |
|---|---|
| *B23K 9/32* | (2006.01) |
| *G06F 3/048* | (2013.01) |
| *B23K 9/10* | (2006.01) |
| *B23K 9/095* | (2006.01) |
| *G06F 3/0488* | (2013.01) |

(52) U.S. Cl.
CPC .............. *B23K 9/32* (2013.01); *B23K 9/0953* (2013.01); *B23K 9/1006* (2013.01); *B23K 9/1062* (2013.01); *G06F 3/0488* (2013.01)

(58) Field of Classification Search
CPC ...... B23K 9/32; B23K 9/1006; B23K 9/0953; B23K 9/1062
See application file for complete search history.

(56) References Cited

U.S. PATENT DOCUMENTS

| | | | | |
|---|---|---|---|---|
| 8,086,780 | B2 * | 12/2011 | Schaller ............ | H04L 12/40032 710/305 |
| 2002/0161473 | A1 * | 10/2002 | Higuchi ............... | B23K 9/0953 700/212 |
| 2013/0112673 | A1 * | 5/2013 | Petrilla .................. | B23K 9/095 219/130.1 |
| 2014/0069900 | A1 * | 3/2014 | Becker ................. | B23K 9/1087 219/130.01 |
| 2015/0268748 | A1 * | 9/2015 | Ge ........................ | G06F 1/1643 345/173 |
| 2018/0041359 | A1 * | 2/2018 | Prussmeier ............. | H04L 12/10 |

* cited by examiner

*Primary Examiner* — Geoffrey S Evans
(74) *Attorney, Agent, or Firm* — McAndrews, Held & Malloy, Ltd.

(57) ABSTRACT

A welding current source (1) having a housing (10) formed from metallic material, a welding inverter (50), a digital, electronic welding process computation unit (20) and a man-machine interface device (30),
wherein the welding process computation unit (20) is set up to actuate the welding inverter (50),
wherein the welding process computation unit (20) and the welding inverter (50) are arranged in the housing (10) and the man-machine interface device (30) is mounted on the welding current source (1) outside the housing (10),
wherein
the welding current source (1) additionally has a digital, electronic man-machine computation unit (40) mounted on the welding current source (1) outside the housing (10), and wherein the man-machine interface device (30) is connected to the man-machine computation unit (40), and wherein the man-machine computation unit (40) and the welding process computation unit (20) are networked to one another via a communication link (60) and form a computer network.

5 Claims, 2 Drawing Sheets

WELDING POWER SOURCE WITH IMPROVED FUNCTIONAL ROBUSTNESS

Figure 1:
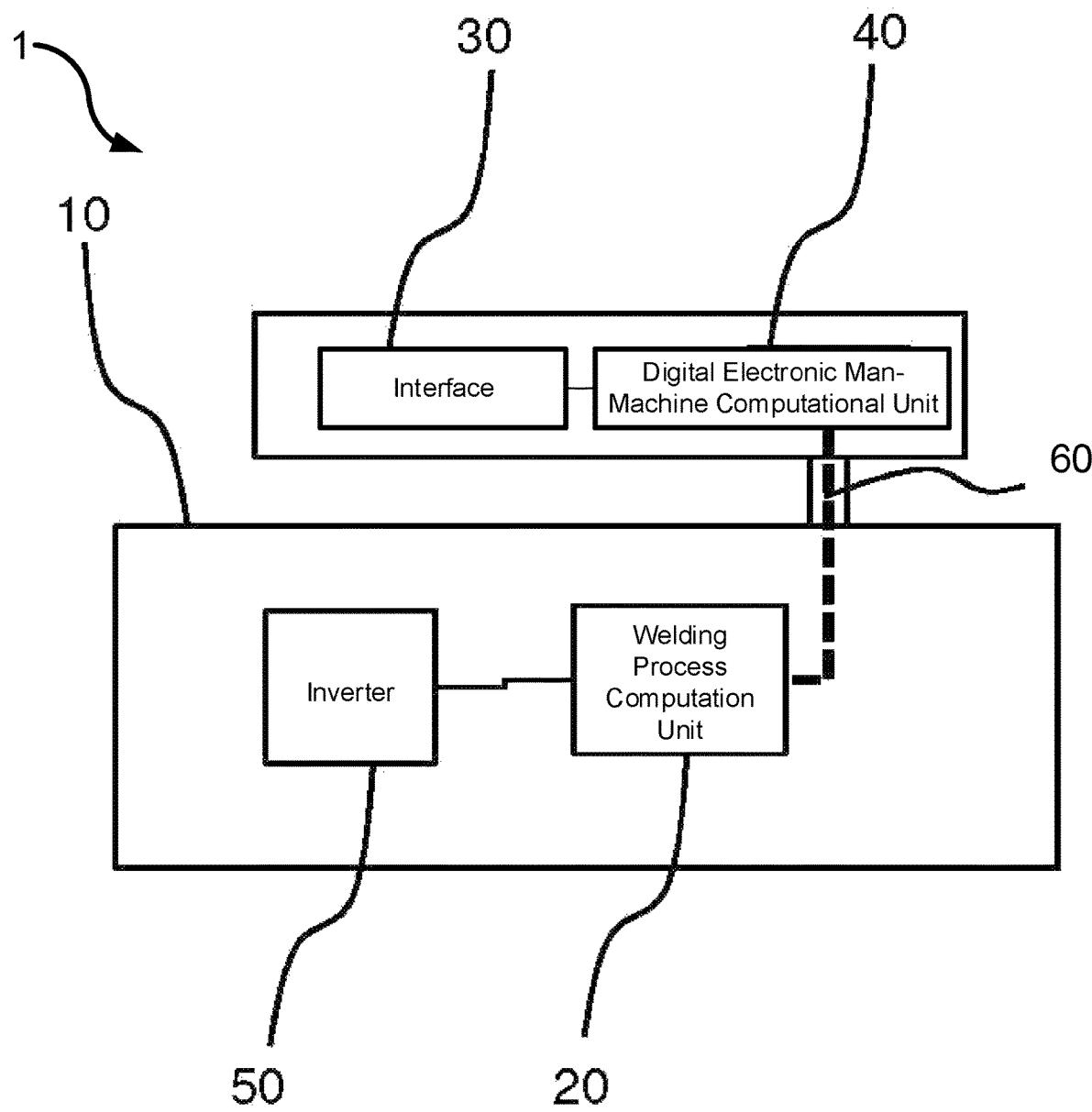

The invention relates to a welding current source having a housing formed from metallic material, a welding inverter, a digital, electronic welding process computation unit and a man-machine interface device. This is preferably a welding current source for orbital welding apparatuses. Such welding current sources are sufficiently well known in the prior art.

The inventors deemed these to be disadvantageous as far as malfunctions intermittently occur in the realm of man-machine interface devices. It is an object of the present invention to improve these disadvantages. The object is achieved by the independent claims. Advantageous developments are defined in the subclaims.

In particular, the object is achieved by a welding current source having a housing formed from metallic material, a welding inverter, a digital, electronic welding process computation unit and a man-machine interface device, wherein the welding process computation unit is set up to actuate the welding inverter, wherein the welding process computation unit and the welding inverter are arranged in the housing and the man-machine interface device is mounted on the welding current source outside the housing, wherein the welding current source additionally has a digital, electronic man-machine computation unit mounted on the welding current source outside the housing, and wherein the man-machine interface device is connected to the man-machine computation unit, and wherein the man-machine computation unit and the welding process computation unit are networked to one another via a communication link, e.g. bus link or Ethernet, and form a computer network.

This decreases the susceptibility of the welding current source to error. The inventors have found that the electromagnetic fields arising during welding mean that man-machine interface functions are at least intermittently defective. To solve the problem, the invention involves a separate second computation unit being used that is better shielded by the housing from the field-generating welding units and that actuates the man-machine interface directly.

A housing formed from metallic material is preferably understood to mean that at least one housing wall as a partition between welding process computation unit/welding inverter and man-machine computation unit/man-machine interface device is formed from metallic material. Preferably, the housing is formed from metallic material on multiple sides, preferably all sides.

A digital, electronic computation unit or digital computer is preferably understood to mean a piece of primarily independent, electronic computer hardware. It preferably has a CPU, main memory, an internal system bus and a network interface.

A man-machine interface device is understood to mean a hardware component that is set up to convert inputs from a user into digital signals (e.g. mouse, keyboard, touchpad or touchscreen) and/or to convert digital signals into signals perceptible to a user (e.g. display), and/or that has a connection point (e.g. USB socket) allowing digital signals to be made available to a user on a memory that is decouplable from the welding current source.

The man-machine interface device is preferably linked to the man-machine computation unit via the internal system bus of the man-machine computation unit and therefore preferably forms a part of the man-machine computation unit.

A computer network is preferably understood to mean an amalgamation of different technical, primarily independent electronic digitally electronic computation units that allows the individual digitally electronic computation units to communicate among one another.

In a further exemplary embodiment of the present invention, the communication link is a field bus link, preferably a CAN bus link. This increases robustness further.

In a further exemplary embodiment of the present invention, the man-machine computation unit and the welding process computation unit are DC isolated from one another, preferably by means of one or more optocoupler(s) or inductive coupler(s). This increases robustness further.

In a further exemplary embodiment of the present invention, the welding current source has a mains voltage input and both the man-machine computation unit and the welding process computation unit are supplied with power via the mains voltage input.

This maintains the simple connection process for the welding current source to the mains power supply despite two computation units.

In a further exemplary embodiment of the present invention, the man-machine computation unit and the man-machine interface device are kept together on a shutter supported movably, preferably swivellably, on the housing, wherein the shutter is movable between an open position, in which the man-machine interface device is usable by a user, and a closed position, in which the man-machine interface device is concealed, preferably by the shutter and the housing.

This allows intuitive operation given a simultaneously space-saving arrangement that provides adequate transport protection with the shutter closed.

In a further exemplary embodiment of the present invention, the man-machine interface device has one or more of the following devices: USB socket, RJ45 socket, HDMI socket, touchscreen, touchpad, keyboard, mouse, printer.

Figure 2:
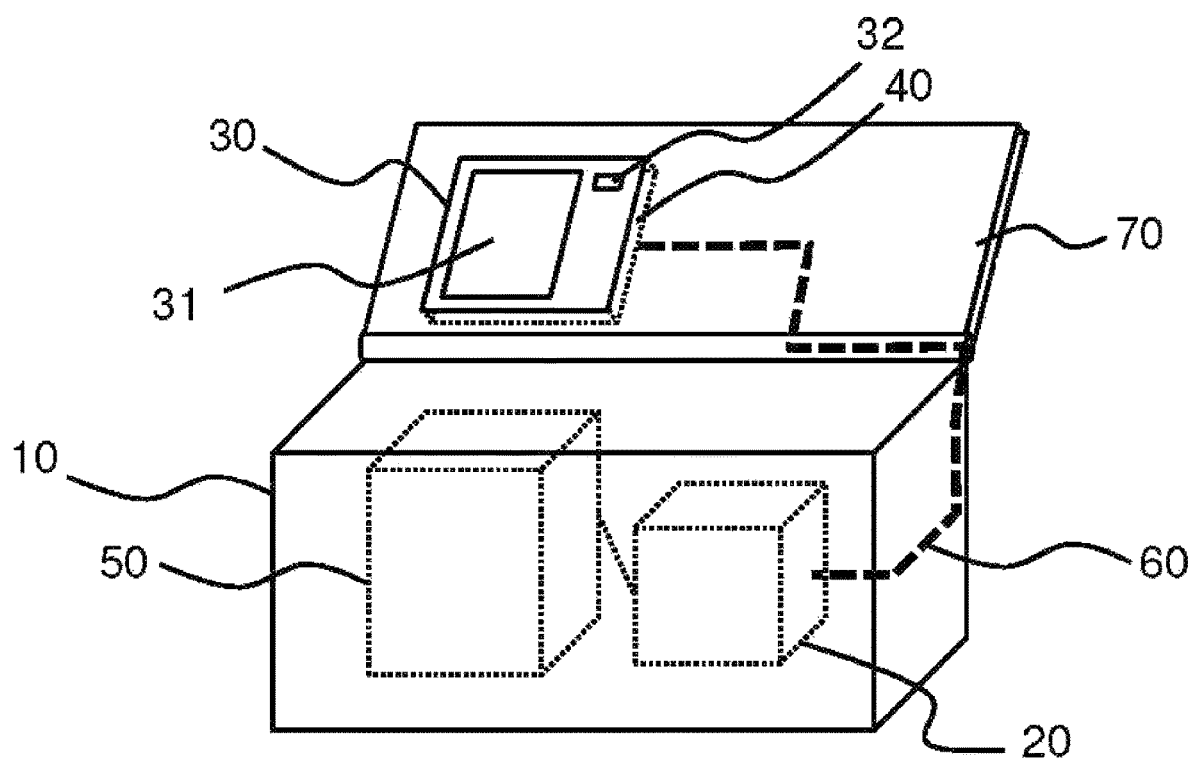

The invention will now be illustrated further by way of example on the basis of drawings, in which:

FIG. 1 shows a schematic diagram of a first welding current source according to the invention, FIG. 2 shows a perspective view of a second welding current source according to the invention.

FIG. 1 shows a welding current source 1 having a housing 10 formed from metallic material, a welding inverter 50, a digital, electronic welding process computation unit 20 and a man-machine interface device 30. The welding process computation unit 20 is set up to actuate the welding inverter 50. The welding process computation unit 20 and the welding inverter 50 are arranged in the housing 10 and the man-machine interface device 30 is mounted on the welding current source 1 outside the housing 10. The welding current source 1 additionally has a digital, electronic man-machine computation unit 40 mounted on the welding current source 1 outside the housing 10. The man-machine interface device 30 is connected to the man-machine computation unit 40, and the man-machine computation unit 40 and the welding process computation unit 20 are networked to one another via a communication link 60 and form a computer network.

FIG. 2 shows a welding current source 1 with the elements of the welding current source from FIG. 1. Additionally, the communication link 60 is a CAN bus field bus link. The man-machine computation unit 40 and the man-machine interface device 30 are kept together on a shutter 70 supported swivellably on the housing 10. The shutter 70 is movable between an open position, in which the man-machine interface device 30 is usable by a user, and a closed position, in which the man-machine interface device 30 is concealed by the shutter 70 and the housing 10. The man-machine interface device 30 has a USB socket 32 and a touchscreen 31.

LIST OF REFERENCE SIGNS

1 Welding current source
10 Housing
20 Welding process computation unit
30 Man-machine interface device
31 Touchscreen
32 USB socket
40 Man-machine computation unit
50 Welding inverter
60 Communication link
70 Shutter

The invention claimed is:

1. A welding current source having a housing formed from metallic material, a welding inverter, a digital, electronic welding process computation unit and a man-machine interface device,
wherein the welding process computation unit is set up to actuate the welding inverter,
wherein the welding process computation unit and the welding inverter are arranged in the housing and the man-machine interface device is mounted on the welding current source outside the housing,
wherein the welding current source additionally has a digital, electronic man-machine computation unit mounted on the welding current source outside the housing,
wherein the man-machine interface device is connected to the man-machine computation unit, and wherein the man-machine computation unit and the welding process computation unit are networked to one another via a communication link and form a computer network, and
wherein the man-machine computation unit and the man-machine interface device are kept together on a shutter supported movably on the housing, and wherein the shutter is movable between an open position, in which the man-machine interface device is usable by a user, and a closed position, in which the man-machine interface device is concealed.

2. The welding current source as claimed in claim 1, wherein the communication link is a field bus link.

3. The welding current source as claimed in claim 1, wherein the man-machine computation unit and the welding process computation unit are DC isolated from one another.

4. The welding current source as claimed in claim 1, wherein the welding current source has a mains voltage input and wherein both the man-machine computation unit and the welding process computation unit are supplied with power via the mains voltage input.

5. The welding current source as claimed in claim 1, wherein the man-machine interface device has one or more of the following devices: USB socket, RJ45 socket, HDMI socket, touchscreen, touchpad, keyboard, mouse, printer.

* * * * *